United States Patent [19]

Dixon et al.

[11] Patent Number: 5,094,801

[45] Date of Patent: Mar. 10, 1992

[54] TWO PIECE PRESSURIZER HEATER SLEEVE

[75] Inventors: Larry D. Dixon; Fred L. Snow; Kenneth B. Stuckey, all of Forest, Va.

[73] Assignee: The Babcock & Wilcox Company, New Orleans, La.

[21] Appl. No.: 468,448

[22] Filed: Jan. 22, 1990

[51] Int. Cl.$^5$ .............................................. G21C 13/00
[52] U.S. Cl. ............................ 376/307; 165/104.32; 29/402.07; 29/890.036
[58] Field of Search ............... 376/307, 203, 260, 292; 165/104.27, 104.32; 29/402.07, 402.08, 402.16, 890.031, 890.036, 906; 228/119

[56] References Cited

U.S. PATENT DOCUMENTS

| | | | |
|---|---|---|---|
| 2,693,026 | 11/1954 | Simpelaar | 29/890.036 |
| 3,114,414 | 12/1963 | Judd | 376/307 |
| 4,135,552 | 1/1979 | Mendolia | 376/307 |
| 4,255,840 | 3/1981 | Loch et al. | 29/402.07 |
| 4,319,961 | 3/1982 | Coussau et al. | 376/307 |
| 4,425,963 | 1/1984 | Scholz et al. | 376/307 |
| 4,717,529 | 1/1988 | Merkovsky et al. | 376/254 |

FOREIGN PATENT DOCUMENTS

| | | | |
|---|---|---|---|
| 2758192 | 6/1979 | Fed. Rep. of Germany | 376/307 |
| 1128819 | 10/1968 | United Kingdom | 376/307 |

*Primary Examiner*—Daniel D. Wasil
*Attorney, Agent, or Firm*—Robert J. Edwards; D. Neil LaHaye

[57] ABSTRACT

A replacement heater sleeve for a nuclear reactor coolant system pressurizer and method for replacing a damaged original heater nozzle. The original heater and heater nozzle are removed from the pressurizer and the original bore is enlarged. An outer sleeve is installed in the enlarged bore on the same center as the original heater nozzle and is substantially flush with the interior of the pressurizer. The outer sleeve is welded to the pressurizer on its interior and exterior surfaces. An inner sleeve is installed in the inner diameter of the outer sleeve and extends beyond the outer sleeve into the pressurizer. The inner sleeve is welded to the lower end of the outer sleeve and is provided with an inner diameter sized to receive a heater of the same size as that originally installed in the pressurizer. The inner sleeve also maintains the original heater alignment in the pressurizer.

2 Claims, 1 Drawing Sheet

TWO PIECE PRESSURIZER HEATER SLEEVE

BACKGROUND OF THE INVENTION

1. Field of the Invention

The present invention is generally related to nuclear system pressurizers and in particular to the heater sleeves in the pressurizers.

2. General Background

The pressurizer in a nuclear reactor coolant system establishes and maintains the reactor coolant system pressure within the prescribed limits of the system. It provides a steam surge chamber and a water reserve to accommodate reactor coolant density changes during operation. A typical pressurizer is a vertical, cylindrical vessel with replaceable electric heaters in its lower section. The electric heaters are positioned below the normal water line and are actuated to restore normal operating pressure when the pressure in the reactor coolant system has decreased.

The electric heaters are comprised of a plurality of heating elements that extend through nozzles or sleeves through the wall of the pressurizer. Support plates inside the pressurizer are provided with holes in coaxial alignment with the holes in the pressurizer wall and the nozzles for receiving and supporting the heating elements. The nozzles extend outward from the pressurizer to provide exterior support to the heating elements. Due to the operating environment, it is a common requirement that heating elements and the nozzles through which they extend be replaced. Because alignment between the support plate holes and the nozzle is critical, it has previously been required that the replacement nozzle be fabricated to original design dimensional specifications and installed into the original bore in the pressurizer wall to insure proper alignment of the nozzle inner diameter with the corresponding support plate hole after welding. This process required that the removal of the original nozzle weld and installation of the repair weld be performed from inside the pressurizer because the bore through the pressurizer could not be enlarged for tooling access without potentially altering the alignment of the heater penetration with respect to the holes in the support plates. Since pressurizer components in nuclear power plants become radioactive after they have been in operation, performing such work inside the pressurizer is difficult and hazardous to personnel and thus impractical. What is needed is a means of replacing the heating element and nozzle without the need for personnel to enter a radioactive pressurizer.

SUMMARY OF THE INVENTION

The present invention solves the above problem in a straightforward manner. What is provided is a two piece pressurizer heater sleeve. After the original nozzle is removed the bore in the pressurizer wall is enlarged in diameter to remove degraded material. An outer sleeve machined for a shrink fit is installed in the enlarged bore. The outer sleeve is structurally welded to the pressurizer outer diameter and seal welded to the pressurizer inner diameter cladding. The inner diameter of the outer sleeve is machined to match that of the original bore to maintain the proper alignment. An inner sleeve sized to fit within the outer sleeve is installed therein and extended into the pressurizer beyond the end of the outer sleeve. The inner sleeve is structurally welded to the outer sleeve on the outside of the pressurizer. The inner diameter of the inner sleeve matches that of the original nozzle once installed so that the heating element may be readily installed and is aligned with holes in the support plate.

BRIEF DESCRIPTION OF THE DRAWINGS

For a further understanding of the nature and objects of the present invention reference should be had to the following description, taken in conjunction with the accompanying drawings, in which like parts are given like reference numerals and, wherein.

DETAILED DESCRIPTION OF THE PREFERRED EMBODIMENT

Figure 1:
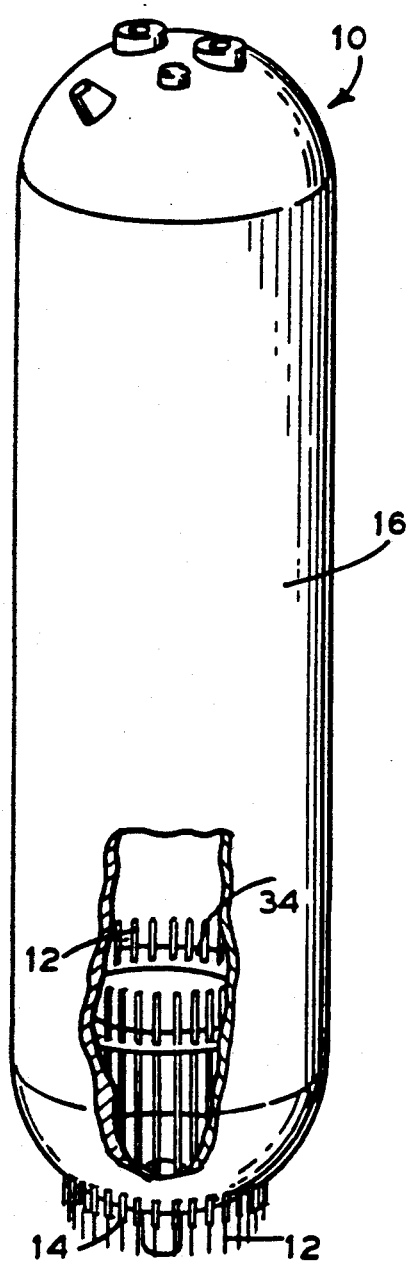
FIG. 1 is a partial cutaway view of a typical pressurizer in a nuclear reactor coolant system.
Figure 2:
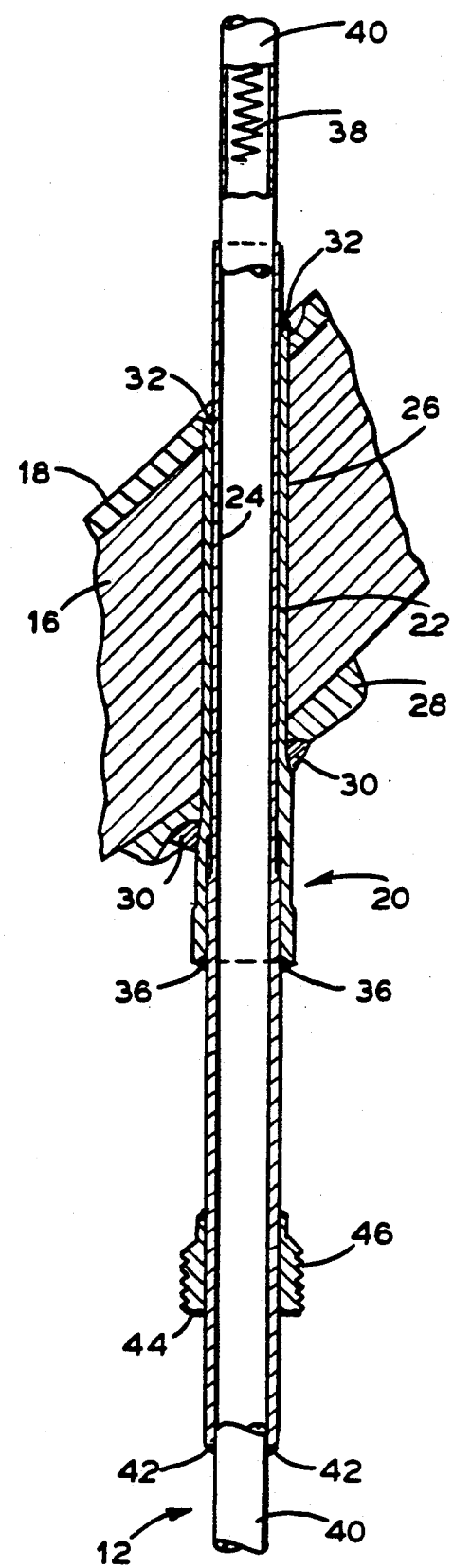
FIG. 2 is a detail sectional view illustrating the invention in its installed position.

FIG. 1 illustrates a typical pressurizer 10 used in a nuclear reactor coolant system. Pressurizer 10 is a vertical, cylindrical vessel with replaceable electric heaters 12 in its lower section that extend through nozzles 14 in the vessel wall 16 into the lower portion of pressurizer 10. Nozzles 14 extend through the vessel wall 16 which is approximately six inches thick and made of carbon steel or low-alloy steel. As seen in FIG. 2, a cladding 18 normally made from stainless steel, is used on the interior surface of the wall 16 for corrosion protection. For ease of illustration, only that portion of heaters 12 that extend into pressurizer 10 are shown. When it is necessary to replace one of original nozzles 14 as a result of damage or corrosion, the entire nozzle 14 is removed from pressurizer 10 and the remaining bore in vessel wall 16 is enlarged so as to accept the present invention.

As seen in FIG. 2, the invention is generally referred to by the numeral 20. Heater sleeve 20 is generally comprised of an outer sleeve 22 and an inner sleeve 24.

Outer sleeve 22 is sized to fit within bore 26 which has been enlarged to accept the invention and to remove any degraded material in vessel wall 16. Outer sleeve 22 is machined for a shrink fit and installed in bore 26 after the weld pad buildup 28 has been prepared. As seen in FIG. 2 the interior or upper end of outer sleeve 22 is cut to match the angle of the interior of vessel wall 16 and cladding 18 and is positioned so as to have its interior or upper end slightly below the upper edge of cladding 18. Once installed in this position outer sleeve 22 is structurally welded to the outer diameter of vessel wall 16 on weld pad buildup 28 as indicated at weld 30 using a partial penetration weld process. The interior or upper end of outer sleeve 22 is seal welded to cladding 18 as indicated at seal weld 32 by automated remote welding equipment that fits through outer sleeve 22. The partial penetration weld at weld 30 is accommodated by the lower end of outer sleeve 22 having a thickened wall. The interior wall of outer sleeve 22 is then machined to insure that there is proper clearance for inner sleeve 24 and that it will be properly aligned with support plate 34 seen in FIG. 1.

Inner sleeve 24 is installed inside outer sleeve 22 with a small clearance therebetween and extends into the interior of pressurizer 10 beyond cladding 18 a minimum of one-half inch and a maximum of one and seven-eighth on the high side of cladding 18. This limits the amount of sludge that can build up between the two sleeves and around the heaters and thus reduces radiological hot spots and problems with heater replacement. Inner sleeve 24 is structurally welded to outer sleeve 22 as indicated by the numeral 36 using a partial penetration weld. If necessary, inner sleeve 24 is then machined in the weld area to insure that there is no obstruction to the installation of electric heater 12.

As seen in FIG. 2, the portion of electric heater 12 which is known in the art and relative to the invention is comprised of heating element 38 encased in heater sheath 40. Heater sheath 40 transfers heat to the water in pressurizer 10 while protecting heating element 38 from damaging direct contact with the water. Heater sheath 40 is welded to inner sleeve 24 as indicated by numeral 42 to prevent leakage of water between the two and maintain pressure in pressurizer 10. Heater locking bushing 44 is welded onto the outer diameter of inner sheath 24 and is provided with threads 46 for threadably engaging a support collar not shown on the lower part of electric heater 12.

In operation, when there is damage to one of nozzles 14 or corrosion has degraded the material in vessel wall 16 of pressurizer 10, electric heater 12 is removed and the damaged nozzle 14 is removed. Bore 26 is enlarged by machining to remove degraded material. Outer sleeve 22 is installed in the enlarged bore so that its upper end is adjacent the upper edge of cladding 18 (substantially flush with the interior of pressurizer 10) and it is then structurally welded to the outer surface or diameter of vessel wall 16 on weld pad buildup 28 by a partial penetration weld indicated at point 30. The upper end of outer sleeve 22 is seal welded to the inner surface of pressurizer 10 or cladding 18 at point 32 to prevent water from contacting the low alloy material of vessel wall 16. The interior diameter of outer sleeve 22 is then machined to the same center as the original bore to maintain the original heater alignment and a free path for inner sleeve 24. Inner sleeve 24 is installed inside outer sleeve 22 with a small clearance and extended into pressurizer 10 beyond the upper end of outer sleeve 22. This reduces the buildup of debris between inner sleeve 24 and heater sheath 40 and reduces potential problems with future heater removal operations. Inner sleeve 24 is welded to the lower end of outer sleeve 22 by a partial penetration weld to prevent water leakage and maintain pressure during operations. The inner diameter of inner sleeve 24 is sized to receive a heater of the same size as that originally installed in pressurizer 10. Electric heater 12, formed from heating element 38 encased in heater sheath 40 is inserted through inner sleeve 24 into pressurizer 10 and the appropriate hole in support plate 34. Heater sheath 40 is welded to the lower end of inner sleeve 24 to prevent water leakage and maintain pressure. Heater locking bushing 44 is welded to inner sleeve 24 and threadably attaches to the remainder of the heater assembly which is known in the art.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a nuclear reactor coolant system pressurizer having a cladding on its interior surface and wherein an original heater and heater sleeve have been removed and the bore for the heater sleeve enlarged, a replacement heater sleeve, said replacement heater sleeve comprising:
  a. an outer sleeve installed in the enlarged bore of the pressurizer on the same center as the original heater sleeve, said outer sleeve having its upper end seal welded to the cladding on the interior of the pressurizer and said outer sleeve being welded to the exterior surface of the pressurizer; and
  b. an inner sleeve installed in the inner diameter of said outer sleeve so as to extend beyond said outer sleeve into said pressurizer and to maintain the original heater alignment in the pressurizer, said inner sleeve being welded to the lower end of said outer sleeve.

2. The heater sleeve of claim 1, wherein said inner sleeve is provided with an inner diameter sized to receive a heater of the same size as that originally installed in the pressurizer.

* * * * *